United States Patent

[11] 3,548,999

| [72] | Inventor | Thomas R. Fischer<br>Wapakoneta, Ohio |
|---|---|---|
| [21] | Appl. No. | 733,488 |
| [22] | Filed | May 31, 1968 |
| [45] | Patented | Dec. 22, 1970 |
| [73] | Assignee | Avco Corporation<br>Coldwater, Ohio<br>a corporation of Delaware |

[54] BUNK FEEDER CONTROLS
3 Claims, 4 Drawing Figs.

[52] U.S. Cl............................................. 198/64
[51] Int. Cl............................................. B65h 29/58
[50] Field of Search....................................... 198/64,
232; 119/52; 222/52, 53, 56

[56] References Cited
UNITED STATES PATENTS

| 3,026,845 | 3/1962 | Winter | 119/52 |
| 3,245,515 | 4/1966 | Rambo | 198/64 |
| 3,330,255 | 7/1967 | Scott | 119/52 |

*Primary Examiner*—Richard E. Aegerter
*Attorneys*—Charles M. Hogan and Gary M. Gron ABSTRACT: The disclosure illustrates an improved control for the opening of a door in an elongated bunk feeder comprising a rotating auger in a trough for conveying a uniform amount of feed along the length of the trough. The door control mechanism comprises a pressure switch mounted at a substantial distance from its end on the last of a series of end-to-end discharge doors. The switch is responsive to a given lateral pressure of feed to actuate opening of the doors before the feed reaches the end to minimize feed buildup.

3,548,999

INVENTOR.
THOMAS R. FISCHER
BY Charles M. Hogan
Gary M. Brown
ATTORNEYS.

3,548,999

BUNK FEEDER CONTROLS

The present invention relates to controls for material distributing apparatus and more particularly to controls for bunk feeders.

The bunk feeder has long been used as a reliable and effective means to automatically provide a supply of feed to a large number of cattle. The bunk feeder generally comprises a trough open on one side and having a rotating auger positioned along its length. A series of doors are mounted over the open side of the trough and may be pivoted to an open position to enable discharge of feed from the trough. In operation, the feed is supplied to one end of the trough via a hopper and the auger uniformly conveys the material from one end of the trough to the other. When the trough is full, several types of door control mechanisms are used to open the doors to enable the uniform discharge of feed from the trough to a bunk.

One type of control is a timer which is set to actuate the door opening mechanism a predetermined time after the feed is started through the trough. This time is selected so that the doors will open just when the feed reaches the end of the trough. While this approach is generally effective, it has a drawback of a high initial cost for the timer. Furthermore, it necessitates adjustment of the timer to accommodate varying types of feed or conditions which would change the flow of feed through the trough.

Another approach has been to position a surface at the outer end of the trough in the path of the feed to actuate the door-opening mechanism when the feed comes up against the surface. While this approach enables the elimination of the timer, it tends to cause a buildup of feed at the end of the trough. This is so because the door-opening mechanism takes some time to travel from the closed to the open position and during this period of time the feed continues to be supplied to the end of the trough. As a result, a larger amount of feed is accumulated at the end.

Accordingly, it is an object of the present invention to provide a bunk feeder having a low-cost, effective and reliable control which enables the bunk feeder to uniformly distribute feed.

The above ends are achieved in one aspect of the present invention by providing the improvement in a bunk feeder of the above type of a means responsive to the presence of feed at a position substantially spaced from the outer end of a bunk feeder trough for actuating door-opening mechanism so that the feed is uniformly discharged from the trough and accumulation of feed at the outer end is minimized, if not eliminated.

Preferably, the means responsive to the presence of feed comprises a pressure sensing device adapted to sense lateral pressure of the feed against a discharge door adjacent the outer end of the trough.

The above and other related objects and features of the present invention will be apparent from a reading of the description of the disclosure shown in the accompanying drawings and the novelty thereof pointed out in the appended claims.

Figure 1:
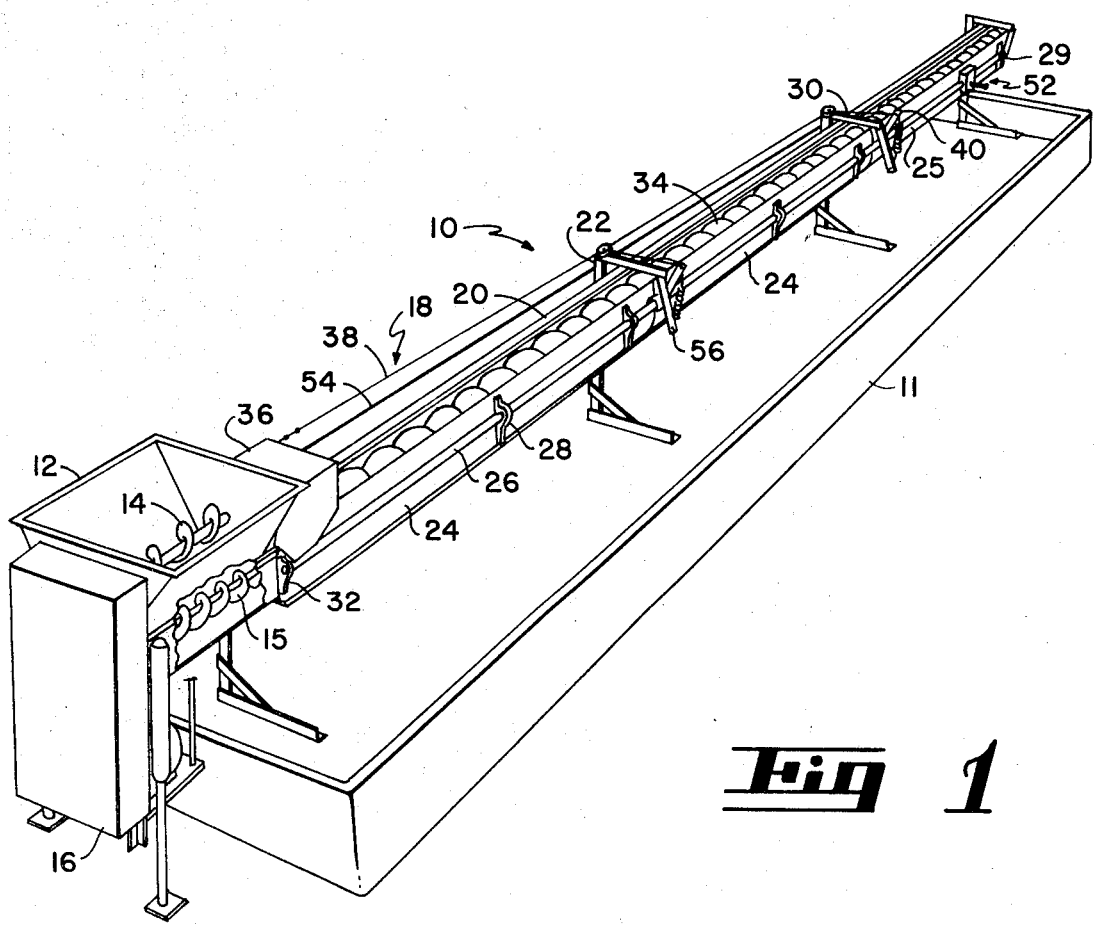
FIG. 1 is a simplified perspective view of a bunk feeder in which a control mechanism embodying the present invention is incorporated.

FIG. 1 illustrates in simplified fashion a bunk feeder 10 comprising a feed-receiving hopper 12 and an elongated trough assembly 18 extending over a cattle-feeding bunk 11. The hopper 12 has augers 14, 15 driven by a power unit 16 for metering a uniform flow of feed to the inlet end of the trough 18.

The trough 18 comprises sections of sheet metal walls 20 supported adjacent their ends by stands 22. The sheet metal walls 20 are formed with an open side near their bottom. A series of end-to-end doors or gates 24, 25 are positioned against the open side of the trough walls 20. The doors 24, 25 are bolted to a series of brackets 28, 29, respectively, that are telescoped over mounting shafts 26. The brackets 28 for the doors 24 are fixed on the shafts 26 by set screws (not shown) and the brackets 29 for the end door 25 are maintained in a loose position, as will later be described. For present purposes, however, it is sufficient to say that the end door 25 is capable of limited pivoting relative to the mounting shafts 26 and the other doors 24.

A series of brackets 30 are fixed to the stands 22 and journal the shafts 26 so that the doors may be pivoted between a position where they close the open side of the trough and a position where they form a discharge opening. The inlet end of the shaft 26 is also journaled in a bracket 32 secured to the hopper unit 12.

A series of augers 34 are connected end to end and positioned in the troughs 18 to uniformly convey feed from the inlet end of the trough to the outer end when the augers 34 are rotated. The augers 34 are connected to the hopper auger 15 which is driven from the power unit 16.

The doors 24, 25 are pivoted from a closed to an open position by a door-displacing unit 36. The unit 36 has a cycling unit which pulls on a cable 38 connected to a crank arm 40 on the support shafts 26 to pivot the doors. A spring-loaded closure device usually is provided to positively maintain the doors against the open side of the trough walls 20 when the door-displacing unit 36 is not in operation. The door-displacing device 36 comprises a motor-driven crank arm (not shown) connected at its free end to the cable 38. Rotation of the crank arm through a 360° cycle produces a displacement output which raises and lowers the doors 24. A finite period of time is required for cycling from the closed to the open position.

In operation the auger power unit 16 is actuated to rotate the augers 14, 15 and 34. Feed is supplied to the hopper 12 and the augers 14 and 15 uniformly meter the feed to the inlet end of the augers 34. The feed is then uniformly conveyed from the inlet end of the trough 18 to the outer end. As the feed approaches the end of the last door 25, a sensing device 52, responsive to the presence of the feed at a substantial distance from the outer end of the trough 18, actuates the door-displacing mechanism 36 to cause the crank handle to rotate to its open position. Since it takes finite amount of time to pivot the doors 24, 25 from the closed to the open position, the upstream end of the feed will have just reached the end of the trough when the doors are finally in the open position to discharge feed. As a result, feed is uniformly distributed without any accumulation of feed at the outer end of the trough 18.

Additional features may be included to minimize buildup of feed at other points along the trough 18, such as an early-closing mechanism generally indicated by reference character 56 for the door adjacent the hopper 18. An example of an early-closing device useful for this purpose is found in U.S. Pat. No. 3,245,515 in the name of Eivind M. Rambo and James R. Beebe, entitled "Automatic Bunk Feeder Mechanism" and of common assignment with the present invention.

Preferably, the sensing unit 52 if responsive to lateral pressure of the feed in the trough 18 against the end door 25 to actuate the door-displacing mechanism 36. The pressure at which the sensing unit 52 actuates the door-displacing mechanism 36 is adjustable so that the arrival of feed at the end of the trough and the opening of the doors 24, 25 may be coincidental.

Figure 2:
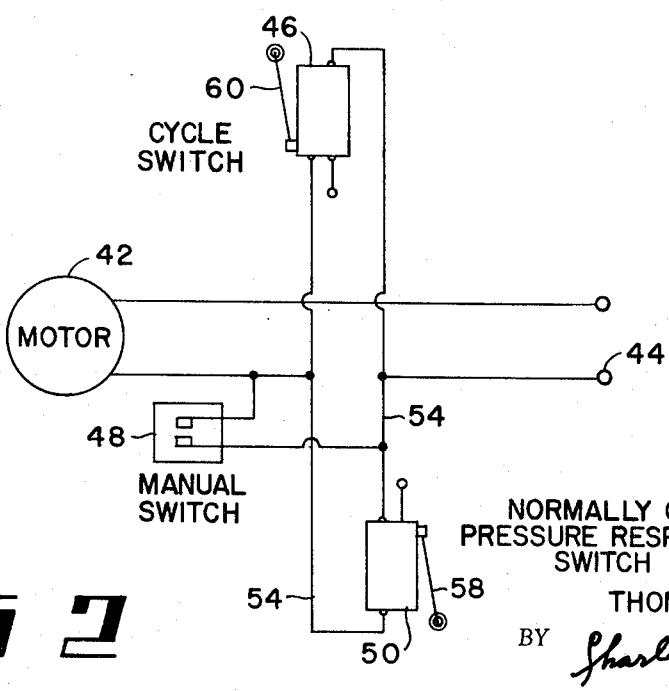
FIG. 2 is a circuit diagram of the electrical portion of the control system incorporated in the bunk feeder of FIG. 1.

As herein illustrated, the crank handle is driven by a door-opening motor 42, shown in FIG. 2. The door-opening motor 42 is supplied with electrical power from a suitable source 44. A series of switches 46, 48 and 50 are interposed in parallel between the electrical source 44 and the motor 42. The switch 50 is a normally open pressure-responsive switch located in the sensing unit 52. This switch 50 is a micro switch having a contact arm 58 actuated from an open to a closed position by the limited pivoting of the end door 25 relative to the support shaft 26 in response to lateral pressure of feed. The closing of the switch 50 connects the source of power via a cable 54 to the door-opening motor 42 which rotates the crank arm through a 360° opening and closing cycle.

As the crank arm is rotated through its cycle, a suitable camming mechanism allows the switch 46 to maintain its normally closed position so that power continues to be supplied to the motor 42 after the feed has been dumped from the gates 24 and the pressure-responsive switch 50 is in its normally open position. The door-opening motor 42 then continues to operate until the contact arm 60 of the switch 46 is urged by the camming mechanism to an open position by the return of the crank arm to a closed position. The switch 48 is provided as an override switch to provide manual operation of the door-closing mechanism.

Thus it can be seen that the control system described enables the door-displacing mechanism 36 to automatically displace the doors to an open position to discharge feed when the trough 18 is full and close to allow a subsequent buildup of feed. This subsequent buildup of feed is also discharged and the process is automatically repeated to supply as much feed as is necessary for the particular requirement.

Figure 3:
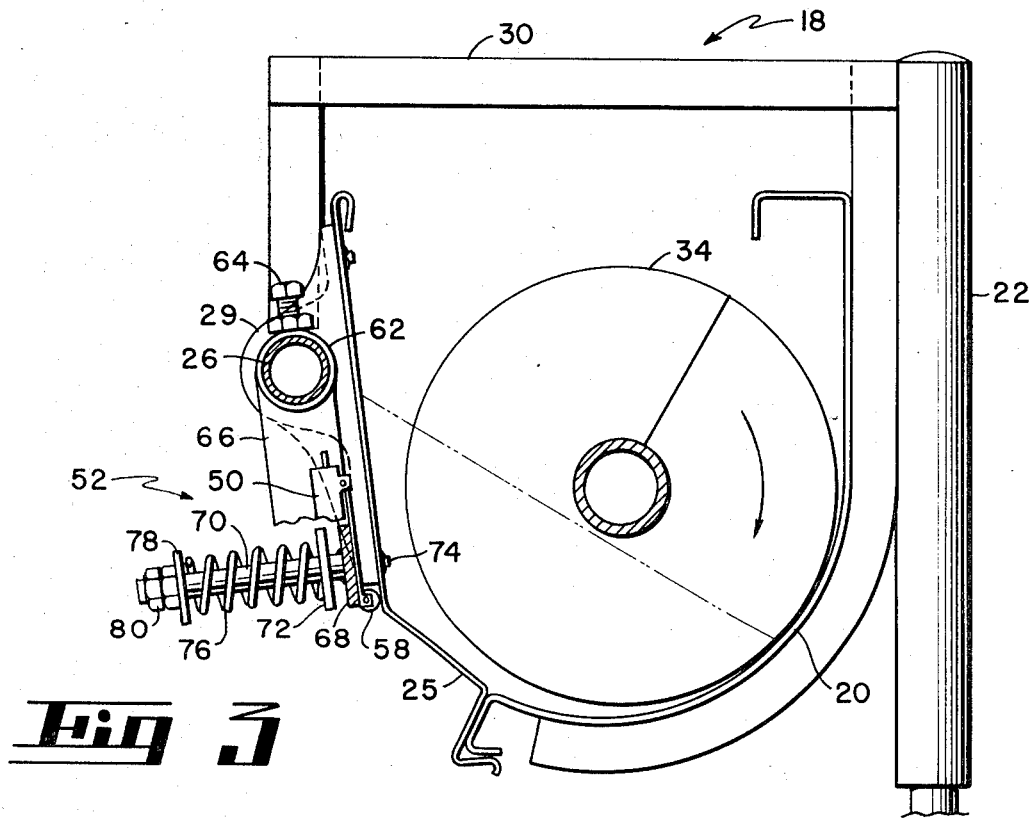
FIG. 3 is an enlarged cross-sectional view of the bunk feeder shown in FIG. 1, particularly illustrating a pressure switch used with the last discharge door of the bunk feeder of FIG. 1.
Figure 4:
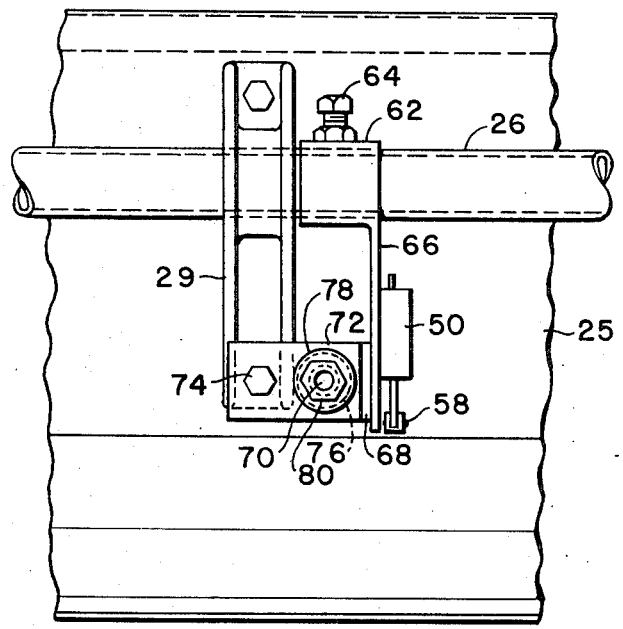
FIG. 4 is an enlarged fragmentary side view of the bunk feeder of FIG. 1 illustrating a side view of the pressure switch shown in FIG. 3.

Reference is now had to FIGS. 3 and 4 which show in detail the pressure-responsive sensing device 52 in position on the end door 25 of the trough 18. As stated previously, the door 25 is mounted on the support shaft 26 by means of a series of brackets 29 bolted to the door 25 and telescoped over the support shaft 26. The brackets 29 and the door 25 are capable of pivoting relative to the shaft 26. The sensing device 52 is positioned adjacent the bracket 29 which is at about the midpoint of the end door 25.

The pressure-responsive device 52 comprises a base member having a sleeve 62 telescoped over the shaft 26 adjacent the bracket 29 and fixed on the shaft 26 by means of a set screw 64. A radial arm 66 extends from the sleeve 62 and has a tab 68 extending from its outer end towards one end of the bracket 29. A shaft 70 extends from the tab 68 tangent to the axis of the shaft 26 and away from the door 25. A second tab 72 is telescoped over and displaceable on the shaft 70. The opposite end of the tab 72 is adapted to be mounted on a bolt 74 which is normally used to secure one end of the bracket 29 to the door 25. A spring 76 is also telescoped over the free end of the shaft 70 and is held thereon by a washer 78 and nuts 80 which engage a threaded portion of the shaft 70.

As herein illustrated, the spring 78 acts on the shaft 26 and yieldably urges the tab 72 and the door 25 to a closed position. The presence of feed in the trough 18 (shown in phantom) acts on the door 25 to pivot it relative to the shaft 26. This relative displacement is used to actuate the switch 50 which is bolted to the radial arm 66 and has its contact arm 58 abutting the door 25. Thus, the displacement of the door 25 in response to lateral pressure of the feed thereagainst, closes the switch to actuate the door-opening mechanism. The pressure at which the door-actuating mechanism is opened is adjusted by tightening or loosening the spring 76 by means of the nuts 80. As previously stated, this enables the travel of feed to be coordinated with the opening of the doors 24.

The invention described above has a particular usefulness in bunk feeder units. It enables a substantial reduction in cost by eliminating complicated timing and sensing units and maintaining a high degree of reliability. Furthermore, by actuating the door mechanism when the feed is a substantial distance from the end of the trough, the opening of the doors and the travel of the feed may be coordinated to have the band of feed discharged into the bunk when the feed has precisely reached the end of the trough. In this way undue buildup of feed at the end of the trough is eliminated.

While a preferred embodiment of the present invention has been described, it should be apparent to those skilled in the art that the invention may be practiced in a manner other than that shown without departing from its spirit. Accordingly, the scope of the invention should be determined solely by the appended claims.

I claim:

1. In a bunk feeder comprising:
    an elongated trough having a longitudinal open portion adjacent the bottom side thereof;
    at least two end-to-end doors mounted over the longitudinal open portion of said trough and displaceable between closed and open positions, said doors being mounted on a longitudinal shaft pivotal relative to said trough, said last door being pivotally displaceable for a limited extent relative to said shaft;
    a rotatable auger mounted therein for uniformly conveying feed from one end of the trough to the opposite end thereof, the door adjacent said opposite end of the trough being displaceable for a limited extent relative to the other door in response to pressure thereagainst;
    means for displacing said door between said closed and open positions, said door-displacing means being actuated by a source of electrical power; and
    the improvement comprising:
        actuating means comprising means fixed relative to said other door and operable upon limited displacement of said last door in response to lateral pressure of feed thereagainst to actuate said displacing means, said actuating means comprising:
        a base mounted on and fixed relative to said shaft;
        spring means having a first end against said base and a second end acting against said last door for urging said last door in a direction opposing the lateral pressure of feed thereagainst; and
        switch means mounted on said base and having a contact arm responsive to displacement of said last door relative to said base and against the urging of said spring means to connect a source of electrical power to said door-displacing means,
        whereby said feed is uniformly discharged from said trough and accumulation of feed at said opposite end is minimized, if not eliminated.

2. Apparatus as in claim 1 wherein said actuating means further comprises means for adjustably positioning the first end of said spring means away from said door thereby to adjust the pressure at which said switch means connects the source of electrical power to said door-displacing means.

3. Apparatus as in claim 2 wherein said bunk feeder is adapted to automatically discharge subsequent loads of feed from said trough, and wherein:
    said door-displacing means is adapted to cycle said doors between a closed and an open position in response to electrical actuation thereof; and
    said bunk feeder further comprises another switch means adapted to provide a parallel electrical connection to the door-displacing means, said other switch being closed during the period wherein said door-displacing means is cycling and open when said door-displacing means returns to a closed position.